United States Patent
Tanaka et al.

(10) Patent No.: US 10,703,316 B2
(45) Date of Patent: Jul. 7, 2020

(54) VEHICLE PILLAR STRUCTURE

(71) Applicant: TOYOTA JIDOSHA KABUSHIKI KAISHA, Toyota-shi (JP)

(72) Inventors: Ken Tanaka, Togo-cho (JP); Masashi Kawamoto, Okazaki (JP); Yasuhiro Ito, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 70 days.

(21) Appl. No.: 16/176,109

(22) Filed: Oct. 31, 2018

(65) Prior Publication Data

US 2019/0152419 A1 May 23, 2019

(30) Foreign Application Priority Data

Nov. 20, 2017 (JP) .................. 2017-223064

(51) Int. Cl.
*B60R 21/04* (2006.01)
*B60R 13/02* (2006.01)
*B62D 25/04* (2006.01)

(52) U.S. Cl.
CPC ............ *B60R 21/04* (2013.01); *B60R 13/025* (2013.01); *B62D 25/04* (2013.01); *B60R 2021/0435* (2013.01)

(58) Field of Classification Search
CPC ................ B60R 21/04; B60R 13/025; B60R 2021/0435; B62D 25/04
USPC .................................................. 296/187.05
See application file for complete search history.

(56) References Cited

U.S. PATENT DOCUMENTS

| | | | | |
|---|---|---|---|---|
| 5,163,730 A | * | 11/1992 | Welch | B60R 13/025 280/751 |
| 5,575,500 A | * | 11/1996 | Mimura | B60R 13/025 280/751 |
| 5,836,641 A | * | 11/1998 | Sugamoto | B60R 13/0206 296/187.05 |
| 5,941,596 A | * | 8/1999 | See | B60J 1/02 296/193.06 |
| 6,592,143 B2 | * | 7/2003 | Takahashi | B60R 21/04 280/730.1 |
| 9,227,673 B2 | * | 1/2016 | Berger | B29C 70/68 |
| D841,550 S | * | 2/2019 | Yamada | D12/196 |
| 10,457,331 B2 | * | 10/2019 | Komoriya | B62D 29/005 |
| 2011/0248525 A1 | * | 10/2011 | Lundstroem | B62D 25/04 296/191 |

FOREIGN PATENT DOCUMENTS

| JP | 2001-163252 | 6/2001 |
|---|---|---|
| JP | 2004-58740 | 2/2004 |
| JP | 2006-56470 | 3/2006 |

* cited by examiner

*Primary Examiner* — Pinel E Romain
(74) *Attorney, Agent, or Firm* — Oblon, McClelland, Maier & Neustadt, L.L.P.

(57) ABSTRACT

There is provided a vehicle pillar structure including: a pillar-shaped component that forms a pillar; a pillar garnish that is disposed on a vehicle cabin side of the pillar-shaped component; and a supporting component that is provided between the pillar-shaped component and the pillar garnish and is capable of undergoing elastic deformation, and that supports one or a plurality of mounted components that have been mounted along the pillar-shaped component.

7 Claims, 5 Drawing Sheets

VEHICLE PILLAR STRUCTURE

CROSS-REFERENCE TO RELATED APPLICATION

This application is based on and claims priority under 35 USC 119 from Japanese Patent Application No. 2017-223064 filed on Nov. 20, 2017, the disclosure of which is incorporated by reference herein.

BACKGROUND

Technical Field

The present disclosure relates to a vehicle pillar structure.

Related Art

A vehicle pillar structure is disclosed in Japanese Unexamined Patent Application (JP-A) No. 2001-163252 in which, in a front pillar for an automobile that is formed by joining an inner frame to an outer frame via a stiffener (i.e., a reinforcing material), a front wall portion of the outer frame is made to protrude outwards, and an impact absorbing portion is interposed between this front wall portion and the stiffener. This impact absorbing portion is formed by a rib that is formed substantially in a U shape so as to protrude towards the vehicle body front side. When an object collides with the front pillar, the impact absorbing portion collapses so that the impact on the object is mitigated.

SUMMARY

However, in a vehicle pillar structure such as that described above, it is necessary to provide a space inside the pillar in order to set up the impact absorbing portion, which is formed by the rib. Because of this, it is difficult to make the size of the pillar cross-section any smaller. Namely, in a conventional structure, it is difficult to reduce the size of the pillar cross-section while simultaneously maintaining the ability to protect a vehicle occupant.

The present disclosure was achieved in view of the above-described circumstances and it is an object thereof to provide a vehicle pillar structure that enables a reduction in the size of the pillar cross-section to be achieved at the same time as the ability to protect a vehicle occupant is maintained.

A vehicle pillar structure according to a first aspect is provided with a pillar-shaped component that forms a pillar, a pillar garnish that is disposed on a vehicle cabin side of the pillar-shaped component, and a supporting component that is provided between the pillar-shaped component and the pillar garnish and is capable of undergoing elastic deformation, and that supports one or a plurality of mounted components that have been mounted along the pillar-shaped component.

The first aspect is applied to a vehicle pillar structure in which a pillar garnish is disposed on a vehicle cabin side of a pillar-shaped component that forms a pillar. In this vehicle pillar structure, a supporting component is provided between the pillar-shaped component and the pillar garnish. This supporting component supports one or a plurality of mounted components that have been mounted along the pillar-shaped component, and is capable of undergoing elastic deformation when it receives compression force from the pillar garnish. Namely, according to the vehicle pillar structure of the first aspect, because a component that supports the mounted components is provided with impact absorption properties, it is no longer necessary for the rib used to absorb impact to be provided on the pillar-shaped component, nor for the space required to house this rib to be provided. Namely, both a reduction in the size of the pillar cross-section and the maintaining of the vehicle occupant protection performance can be achieved.

In a vehicle pillar structure of a second aspect, the pillar garnish is formed substantially in a U shape whose cross-section has an opening on a pillar-shaped component side thereof. The pillar garnish includes protruding portions that are formed protruding from a rear surface of the pillar garnish, and projecting portions that are formed on the protruding portions so as to protrude in a direction that intersects a direction faced by the openings. The supporting component has a holding portion that holds the protruding portions and the projecting portions.

In the vehicle pillar structure of the second aspect, protruding portions are formed protruding from a rear surface of a pillar garnish, and projecting portions are formed on the protruding portion so as to protrude in a direction that intersects the direction faced by the openings. In the vehicle pillar structure of the second aspect, the pillar garnish is fixed to the supporting component as a result of the protruding portions of the pillar garnish being held by a holding portion that is provided on the supporting component. Additionally, the pillar garnish is prevented from coming free from the supporting component as a result of the projecting portions of the pillar garnish being held by the holding portion provided on the supporting component.

In a vehicle pillar structure of a third aspect, the supporting component has a first base portion on which are formed first fixing portions for fixing the pillar-shaped component, a second base portion on which are formed second fixing portions for fixing the pillar-shaped component, and a hinge portion that rotatably connects the second base portion to the first base portion.

According to the vehicle pillar structure of the third aspect, because the supporting component is able to open and close via the hinge portion, attaching the supporting component to a pillar-shaped component having a small-sized cross-section is simplified.

In a vehicle pillar structure of a fourth aspect, the first fixing portions and the second fixing portions are fixed to mutually different surfaces of the pillar-shaped component.

According to the vehicle pillar structure of the fourth aspect, because the supporting component is fixed to different surfaces of the pillar-shaped component, the supporting component can still be fixed firmly to the pillar-shaped component even if the pillar-shaped component has a small-sized cross-section.

In a vehicle pillar structure of a fifth aspect, a space bounded by the first base portion, the hinge portion, and the second base portion forms a housing portion in which one of the mounted components is housed.

In the vehicle pillar structure of the fifth aspect, a housing portion for one of the mounted components is capable of being opened and closed. Namely, according to the vehicle pillar structure of the fifth aspect, mounted components having a large external diameter can be easily fixed to the supporting component. Moreover, because the mounted components can be gripped by the hinge portion, the mounted components can be reliably fixed to the supporting component.

According to the present disclosure, it is possible to reduce the size of a pillar cross-section while simultaneously maintaining an ability to protect a vehicle occupant.

BRIEF DESCRIPTION OF THE DRAWINGS

Exemplary embodiments of the present disclosure will be described in detail based on the following figures, wherein.

DETAILED DESCRIPTION

Hereinafter, an exemplary embodiment of a vehicle pillar structure according to the present disclosure will be described. Note that an arrow FR, an arrow OUT, and an arrow UP that are shown in the appropriate drawings respectively indicate a front side in the front-rear directions of a vehicle, an outer side in the width directions of a vehicle, and an upper side in the up-down directions of a vehicle.

(Structure)

Figure 1:
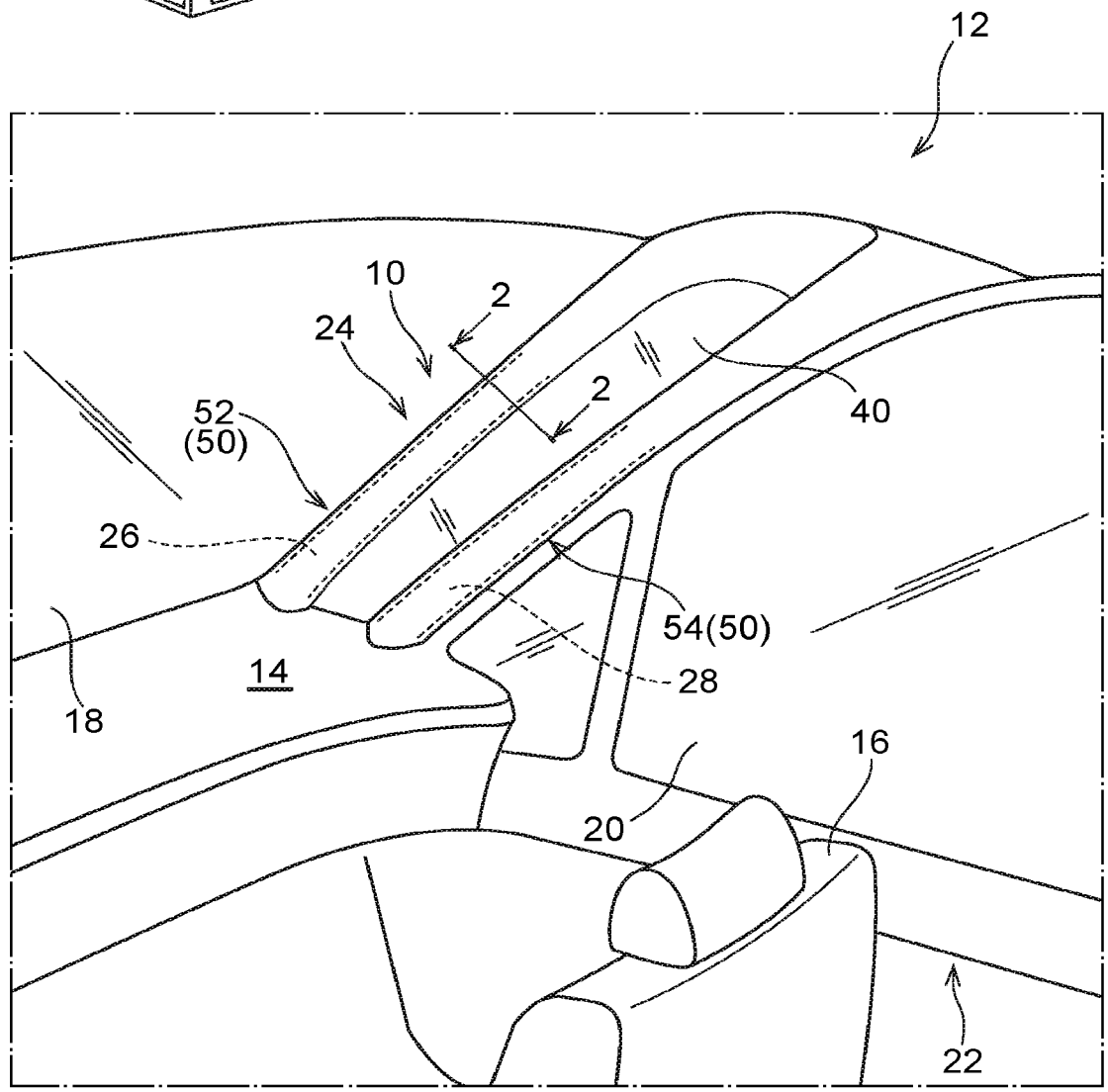
FIG. 1 is a perspective view showing an outline of a vehicle cabin interior of a vehicle having a vehicle pillar structure according to an exemplary embodiment.

As is shown in FIG. 1, a pair of left and right vehicle seats 16 are disposed on a vehicle front side inside a vehicle cabin 14 of a vehicle 12 in which a vehicle pillar structure 10 according to the present exemplary embodiment has been applied. A driver (not shown in the drawings) is able to sit in one of these vehicle seats 16. Note that, as an example, the vehicle 12 of the present exemplary embodiment is a left-hand drive vehicle, and an illustration of the vehicle seat 16 on the driver's side has been omitted from FIG. 1.

Front windshield glass (hereinafter, referred to simply as 'front glass') 18 is provided on the vehicle front side of the vehicle seat 16. This front glass 18 is a transparent window component that separates the interior side of the vehicle cabin 14 from the exterior side of the vehicle cabin 14, and whose plate thickness direction is substantially the same as the vehicle front-rear direction. When looked at in a side view, the front glass 18 slopes towards the vehicle rear side as it approaches the vehicle upper side. Although not shown in the drawings, an upper end portion of the front glass 18 is connected to a front header, which is a front end portion of the roof that is formed so as to include a roof panel. Moreover, a lower end portion of the front glass 18 is disposed so as to face, in the vehicle front-rear direction, a rear end portion of a hood that covers, from the vehicle upper side, a power unit room that is provided on the vehicle front side. The lower end portion of the front glass 18 is connected to a cowling that extends in the vehicle width direction.

The front glass 18 is formed having a uniform plate thickness, and is formed having a gently curved shape such that a central portion in the vehicle width direction of the front glass 18 protrudes towards the vehicle front side. In addition, a pair of left and right front pillars 24 are provided respectively on outer sides in the vehicle width direction of the front glass 18, and on the vehicle front side of front doors 22 that each have a front side window 20.

The pair of left and right front pillars 24 extend substantially in the vehicle up-down direction along respective end portions in the vehicle width direction of the front glass 18. Namely, the pair of left and right front pillars 24 each slope towards the vehicle rear side as they approach the vehicle upper side. Hereinafter, the front pillar 24 on the right-hand side in the vehicle width direction is described, however, the front pillar 24 on the left-hand side in the vehicle width direction has the same structure.

As is shown in FIG. 1, the front pillar 24 has a first pillar 26 and a second pillar 28. Here, the vehicle pillar structure 10 according to the present exemplary embodiment is applied to the first pillar 26.

Figure 2:
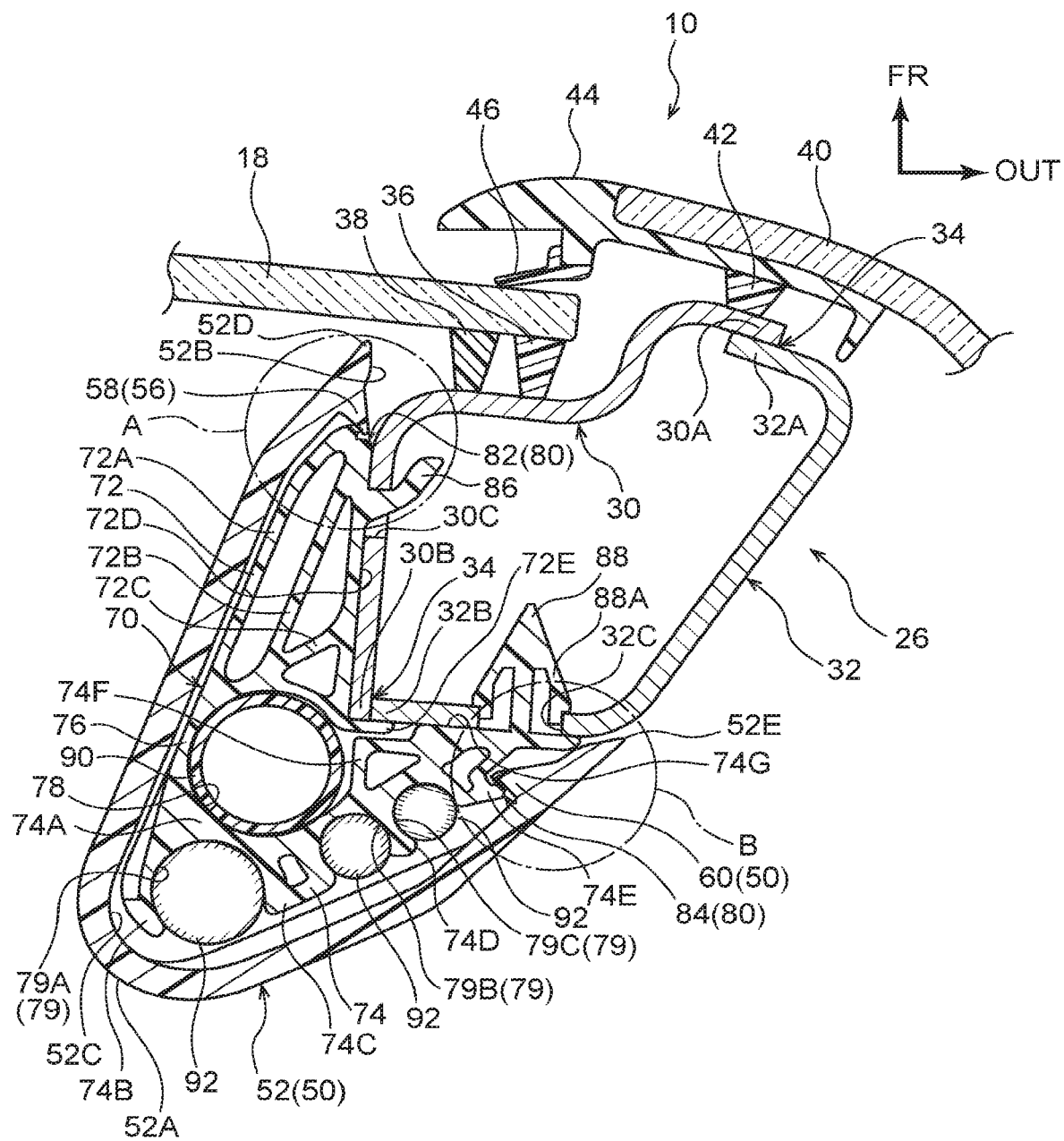
FIG. 2 is an enlarged cross-sectional view showing a state of a cross-section along a line 2-2 in FIG. 1.

The first pillar 26 extends substantially in the vehicle up-down direction. As is shown in FIG. 2, an end portion in the vehicle width direction of the front glass 18 is joined via a urethane adhesive agent 36 and cushion rubber 38 to the first pillar 26. The first pillar 26 is formed so as to include a first pillar inner panel 30 that is made from steel plate and serves as a pillar inner panel, and a first pillar outer panel 32 that is made from steel plate and serves as a pillar outer panel. A cross-sectional configuration of the first pillar inner panel 30 that is perpendicular to an extension of the substantially vehicle up-down direction of the first pillar 26 (hereinafter, referred to as the 'longitudinal direction') is formed substantially in the shape of a crank. A cross-sectional configuration of the first pillar outer panel 32 that is perpendicular to the longitudinal direction is formed substantially in a U shape which is open substantially towards the inner side in the vehicle width direction. Additionally, in the present exemplary embodiment, by joining the first pillar inner panel 30 and the first pillar outer panel 32 together, a cross-section of these that is perpendicular to the longitudinal direction is formed as a closed cross-section.

More specifically, the first pillar inner panel 30 and the first pillar outer panel 32 are joined together via a weld portion 34. Even more specifically, a flange portion 30A of the first pillar inner panel 30 and a flange portion 32A of the first pillar outer panel 32 are mutually superimposed and then welded together via a weld portion 34 on the vehicle front side. Additionally, an end portion 30B of the first pillar inner panel 30 and an end portion 32B of the first pillar outer panel 32 are butted together and then welded via a weld portion 34 on the vehicle rear side.

As is shown in FIG. 1, the second pillar 28 is disposed substantially on the vehicle rear side of the first pillar 26. More specifically, the second pillar 28 is disposed at a predetermined distance substantially in the vehicle front-rear direction from the first pillar 26. This predetermined distance is set as equal to or greater than an interpupillary distance of a driver sitting in the vehicle seat 16. Note that the 'interpupillary distance' is the distance from the center of the pupil of the right eye (not shown in the drawings) of the driver to the center of the pupil of the left eye (not shown in the drawings) thereof, and in the case of a Japanese adult, is approximately 60~65 mm. In the present exemplary embodiment, as an example, this predetermined distance is set to 65 mm.

Moreover, the second pillar 28 extends substantially in parallel with the first pillar 26 (i.e., in the longitudinal direction). Although not shown in the drawings, the second pillar 28 is formed so as to include a second pillar inner panel, which is made from steel plate and serves as a pillar inner panel, and a second pillar outer panel, which is made from steel plate and serves as a pillar outer panel. In the present exemplary embodiment, by welding both end portions of the second pillar inner panel and the second pillar outer panel so that these are joined together, the resulting cross-section thereof which is perpendicular to the longitudinal direction is formed as a closed cross-section.

A gap between the first pillar 26 and the second pillar 28 is bridged from substantially the outer side in the vehicle width direction by pillar outer glass 40. As is shown in FIG. 2, the pillar outer glass 40 is joined to the first pillar 26 via a urethane adhesive agent 42 and cushion rubber 44. The pillar outer glass 40 is a transparent window component whose plate thickness direction is substantially the same as the vehicle width direction, and when looked at in a side view, the pillar outer glass 40 slopes towards the vehicle rear side as it approaches the vehicle upper side (see FIG. 1). Note that a sealing component 46 is provided between the pillar outer glass 40 and the front glass 18, and rainwater and the like is prevented from penetrating between the pillar outer glass 40 and the front glass 18 by the sealing component 46. Note also that the pillar outer glass 40 is not limited to being formed from glass, and may also be formed from transparent fiber-reinforced resin or the like.

As is shown in FIG. 1, a front pillar garnish 50 is provided on an inner side in the vehicle width direction of the first pillar 26 and the second pillar 28. This front pillar garnish 50 is made from resin and is formed so as to include a front-side garnish 52, which is provided on the vehicle cabin 14 side of the first pillar 26, and a rear-side garnish 54, which is provided on the vehicle cabin 14 side of the second pillar 28.

Hereinafter, the structure of the first pillar 26 will be described in detail. As is shown in FIG. 2, the front-side garnish 52, which is serving as a pillar garnish, is fixed to the first pillar 26, which is serving as a pillar-shaped component, via a clamp 70, which is serving as a supporting component. A cross-sectional view of this clamp 70 taken in a perpendicular direction relative to the longitudinal direction shows that the clamp 70 is disposed between the first pillar 26 and the front-side garnish 52.

In a cross-sectional view taken in a perpendicular direction relative to the longitudinal direction, the front-side garnish 52 is a substantially U-shaped plate component having an apex portion 52A on the vehicle rear side thereof and an opening 52B on the vehicle front side thereof. This front-side garnish 52 is made from resin, and is capable of being elastically deformed in the direction faced by the opening 52B.

Figure 3A:
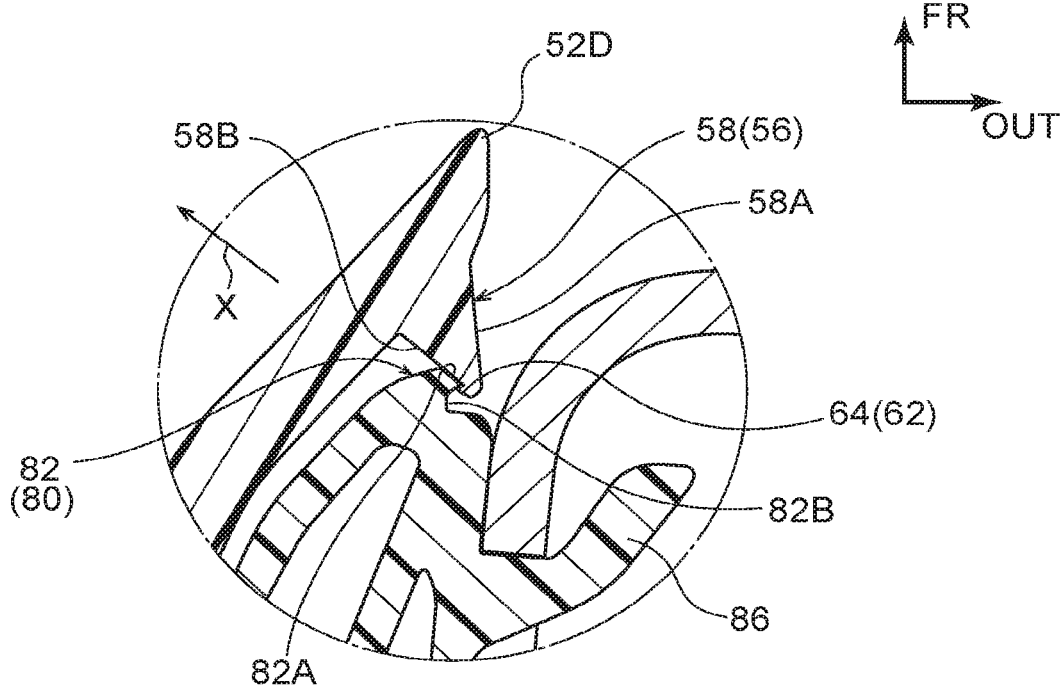
FIG. 3A is an enlarged cross-sectional view showing a fixing portion of a front-side garnish, and is an enlargement of a circular area A shown in FIG. 2.

Here, first protruding portions 58 and second protruding portions 60 are formed as protruding portions 56 on a rear surface 52C of the front-side garnish 52. More specifically, the first protruding portions 58 are formed in the vicinity of an end portion 52D on the vehicle front side of the front-side garnish 52. As is shown in FIG. 3A, the first protruding portions 58 have a cross-section in the shape of a right-angle triangle, and have a sloping surface 58A on the end portion 52D side thereof, and a vertical surface 58B on the opposite side thereof from the end portion 52D. A plurality of the first protruding portions 58 are formed in the longitudinal direction of the front-side garnish 52. Moreover, a first projecting portion 64, which is one of plural projecting portions 62, is formed on the vertical surface 58B so as to protrude from a distal end side of the first protruding portions 58. This first projecting portion 64 protrudes in a perpendicular direction relative to the direction faced by the opening 52B (see an arrow X in FIG. 3A), and the height thereof is set to approximately 0.3 mm.

Figure 3B:
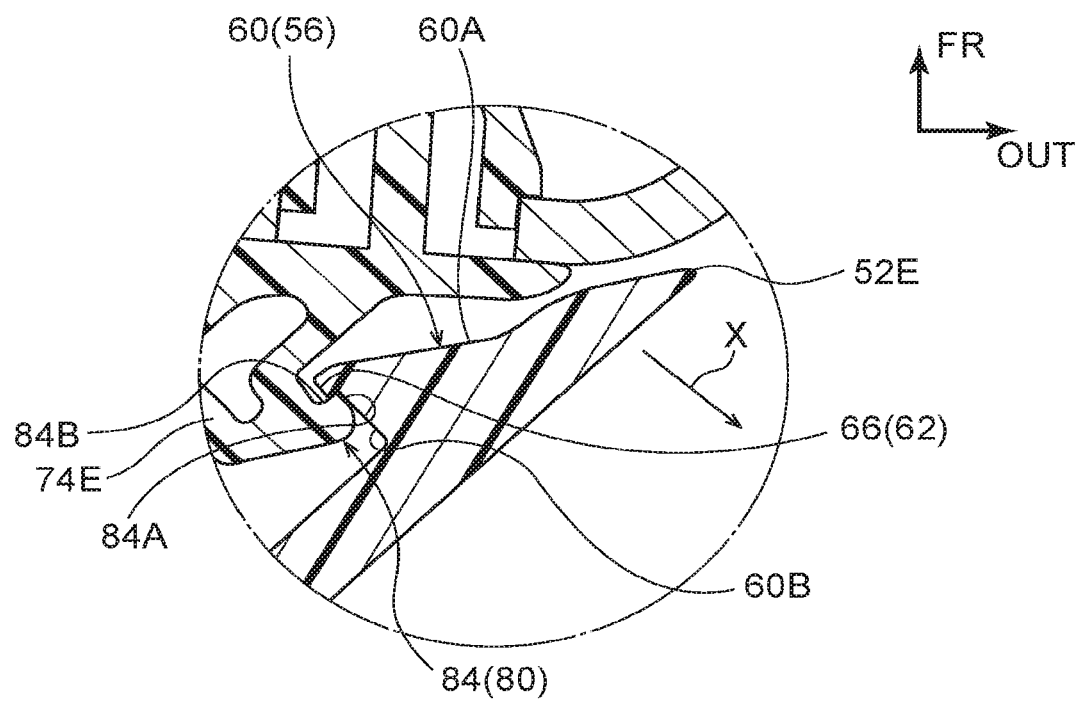
FIG. 3B is an enlarged cross-sectional view showing a fixing portion of a front-side garnish, and is an enlargement of a circular area B shown in FIG. 2.

In contrast, the second protruding portions 60 are formed in the vicinity of an end portion 52E on the outer side in the vehicle width direction of the front-side garnish 52. As is shown in FIG. 3B, the second protruding portions 60 have a cross-section in the shape of a right-angle triangle, and have a sloping surface 60A on the end portion 52E side thereof, and a vertical surface 60B on the opposite side thereof from the end portion 52E. A plurality of the second protruding portions 60 are formed in the longitudinal direction of the front-side garnish 52. Moreover, a second projecting portion 66, which is one of the plural projecting portions 62, is formed on the vertical surface 60B so as to protrude from a distal end side of the second protruding portions 60. This second projecting portion 66 protrudes in a perpendicular direction relative to the direction faced by the opening 52B (see an arrow X in FIG. 3B), and the height thereof is set to approximately 0.3 mm.

As is shown in FIG. 2, the clamp 70 is made from resin, and a length thereof in the longitudinal direction is set to approximately 40 mm. This clamp 70 has a function of supporting on the first pillar 26 a drain hose 90, which is a mounted component mounted along the first pillar 26, and also a plurality of wire harnesses 92. Additionally, the clamp 70 has a first base portion 72, which faces towards the first pillar inner panel 30, a second base portion 74, which faces towards the first pillar outer panel 32, and a hinge portion 76 that rotatably connects the second base portion 74 to the first base portion 72.

The first base portion 72 has a triangular pillar-shaped cylinder portion 72A, and a first rib 72B and a second rib 72C that are suspended from an inner circumferential surface of the cylinder portion 72A. Here, as is shown in FIG. 3A, a first holding portion 82, which is a holding portion 80 that holds the first protruding portion 58 and the first projecting portion 64, is formed on an end portion on the vehicle front side of the cylinder portion 72A. More specifically, the first holding portion 82 has an abutting surface 82A that abuts against the vertical surface 58B of the first protruding portion 58, and a housing portion 82B that is provided substantially on the outer side in the vehicle width direction of the abutting surface 82A, and houses the first projecting portion 64.

Moreover, as is shown in FIG. 2, the first base portion 72 has anchoring portions 86, which are hooks that protrude towards the outer side in the vehicle width direction and also towards the vehicle front side from a fixing surface 72D, which is a surface on the outer side in the vehicle width direction of the first base portion 72 and which abuts against the first pillar inner panel 30. A plurality of these anchoring portions 86 are formed in the longitudinal direction. When the clamp 70 is fixed to the first pillar 26, the anchoring portions 86 are anchored by being inserted through through holes 30C that are formed in the first pillar inner panel 30. Namely, the anchoring portions 86 correspond to first fixing portions that are used to fix the clamp 70 to the first pillar 26.

In addition, a planar wall plate portion 72E that protrudes towards the outer side in the vehicle width direction from the vehicle rear side of the fixing surface 72D is formed on the first base portion 72. This wall plate 72E abuts against the end portion 30B of the first pillar inner panel 30 when the clamp 70 is fixed to the first pillar 26.

The second base portion 74 has a plate-shaped portion 74A whose cross-section taken in a perpendicular direction relative to the longitudinal direction is substantially V-shaped, projection-shaped portions 74B, 74C, 74D, and 74E that are formed protruding outwards on the vehicle rear side of the plate-shaped portion 74A so as to extend in the longitudinal direction, and a projection-shaped portion 74F that is formed protruding outwards on the vehicle front side of the plate-shaped portion 74A so as to extend in the longitudinal direction. The projection-shaped portions 74B, 74C, 74D, and 74E are arranged in that sequence from the inner side in the vehicle width direction. Here, the projection-shaped portion 74C has a substantially U-shaped cross-section so that a substantially square pillar-shaped tube portion is formed by the projection-shaped portion 74C and the plate-shaped portion 74A. Furthermore, the projection-shaped portion 74E has a substantially inverted V-shaped cross-section so that a substantially triangular pillar-shaped tube portion is formed by the projection-shaped portion 74E and the plate-shaped portion 74A. Additionally, the projection-shaped portion 74F has a substantially inverted V-shaped cross-section so that a substantially triangular pillar-shaped tube portion is formed by the projection-shaped portion 74F and the plate-shaped portion 74A.

As is shown in FIG. 3B, a second holding portion 84, which is a holding portion 80 that holds the second protruding portions 60 and the second projecting portion 66, is formed on an end portion on the outer side in the vehicle width direction of the projection-shaped portion 74E. More specifically, the second holding portion 84 has an abutting surface 84A that abuts against the vertical surface 60B of the second protruding portions 60, and a housing portion 84B that is provided on the vehicle front side and the inner side in the vehicle width direction relative to the abutting surface 84A, and houses the second projecting portion 66.

Moreover, as is shown in FIG. 2, the second base portion 74 has clips 88 that protrude towards the vehicle front side from a fixing surface 74G, which is a vehicle front-side surface and which abuts against the first pillar outer panel 32. A plurality of these clips 88 are formed in the longitudinal direction. When the clamp 70 is fixed to the first pillar 26, the clips 88 are anchored in fixing holes 32C that are formed in the first pillar outer panel 32. More specifically, after the clips 88 have been inserted through the fixing holes 32C, claw portions 88A that are provided on the clips 88 are spread open in the vehicle width direction, thereby anchoring the clips 88. Namely, the clips 88 correspond to second fixing portions that fix the clamp 70 to the first pillar 26.

In the clamp 70 of the present exemplary embodiment, the first base portion 72, the second base portion 74, and the hinge portion 76 are formed integrally with each other, however, the hinge portion 76 is formed having a reduced-thickness cross-section in a perpendicular direction relative to the longitudinal direction. Namely, the hinge portion 76 of the present exemplary embodiment is formed as what is known as an integral hinge.

As has been described above, the clamp 70 of the present exemplary embodiment has the function of supporting the drain hose 90 and the plurality of wire harnesses 92. As is shown in FIG. 2, in the present exemplary embodiment, a space bounded by the first base portion 72, the hinge portion 76, and the second base portion 74 forms a housing portion 78 where the drain hose 90 is housed. More specifically, the housing portion 78 is formed by a surface on the vehicle rear side of the cylinder portion 72A, the hinge portion 76, and a surface on the vehicle front side of the plate-shaped portion 74A.

Restraining portions 79 inside which are housed three wire harnesses 92 are formed in the second base portion 74. More specifically, a space between the projection-shaped portion 74B and the projection-shaped portion 74C forms a first restraining portion 79A, a space between the projection-shaped portion 74C and the projection-shaped portion 74D forms a second restraining portion 79B, and a space between the projection-shaped portion 74D and the projection-shaped portion 74E forms a third restraining portion 79C.

(Method of Manufacturing)

Hereinafter, a method of manufacturing the vehicle pillar structure 10 of the present exemplary embodiment will be described. Firstly, the clamp 70 is fixed to the first pillar 26 in which the front glass 18 and the pillar outer glass 40 have already been fitted. Specifically, an operator holds the clamp 70 and inserts the anchoring portions 86 provided on the first base portion 72 through the corresponding through holes 30C. Next, while the anchoring portions 86, which are formed by hooks, are anchored in the through holes 30C, the operator rotates the first base portion 72 towards the vehicle rear side (i.e., in an anticlockwise direction in FIG. 4) so as to cause the fixing surface 72D and the wall plate portion 72E to abut against the first pillar inner panel 30.

Figure 4:
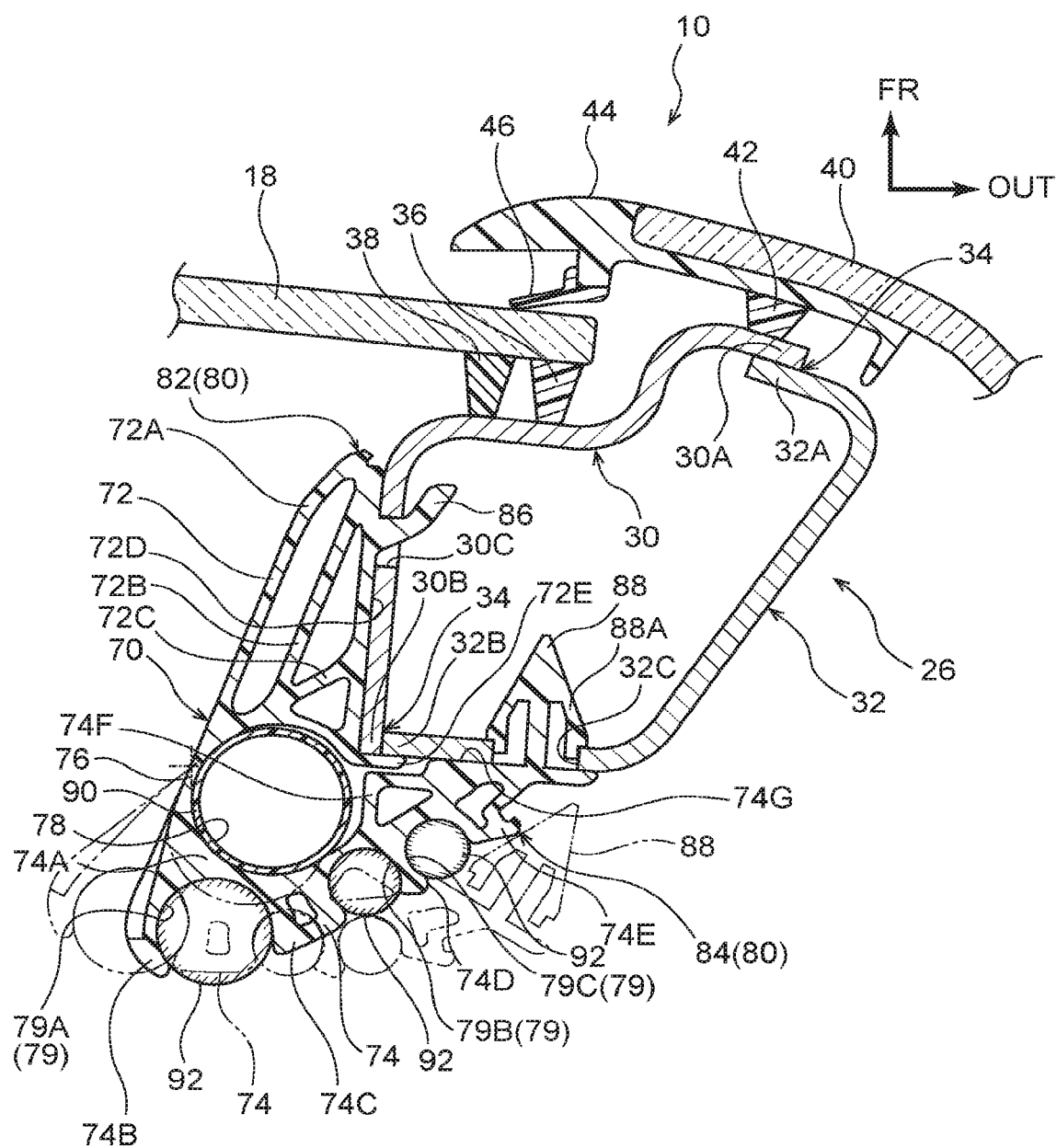
FIG. 4 is a cross-sectional view illustrating a method of fixing a supporting component.

Next, while the first base portion 72 is abutted against the first pillar inner panel 30, the operator causes the second base portion 74 to rotate towards the inner side in the vehicle width direction (i.e., in a clockwise direction in FIG. 4) using the hinge portion 76 as the rotation axis so as to open up the housing portion 78 (see the double-dot chain line in FIG. 4). Next, once the drain hose 90 has been housed in the opened housing portion 78, the operator causes the second base portion 74 to rotate towards the outer side in the vehicle width direction (i.e., in an anticlockwise direction in FIG. 4) using the hinge portion 76 as the rotation axis.

Next, the operator inserts the clips 88 into the corresponding fixing holes 32C. At this time, as a result of the operator pressing the second base portion 74 against the first pillar outer panel 32C, the fixing surface 74G is abutted against the first pillar outer panel 32, and the claw portions 88A provided on the clips 88 are spread open in the vehicle width direction, so that the clips 88 become anchored. Namely, the second base portion 74 is fixed to the first pillar 26. Additionally, because movement of the first base portion 72 is restricted as a result of the second base portion 74 being fixed in position, the first base portion 72 is anchored to the first pillar 26 by the anchoring portions 86.

As is described above, as a result of the first base portion 72 being anchored to the first pillar 26 by the anchoring portions 86, and the second base portion 74 being anchored to the first pillar 26 by the clips 88, the clamp 70 is fixed to the first pillar 26. Additionally, as a result of the clamp 70 being fixed to the first pillar 26, the housing portion 78 is closed, and the drain hose 90 is consequently supported.

Next, the respective wire harnesses 92 are housed in their corresponding restraining portion 79. Note that the aperture portion of each restraining portion 79 is formed slightly narrower than the wire harness 92 that is housed therein. Because of this, when the wire harnesses 92 are pushed into their respective restraining portions 79, the wire harnesses 92 are housed and also restrained in that restraining portion 79.

Finally, the front-side garnish 52 is fixed to the clamp 70. More specifically, the operator holds the front-side garnish 52 and moves the front-side garnish 52 towards the first pillar 26 in such a way that the clamp 70 passes through the opening 52B. Here, as a result of the operator pressing the front-side garnish 52 against the clamp 70, the protruding portions 56 and the projecting portions 62 are held in the holding portion 80. More specifically, the first protruding portions 58 are anchored on the abutting surface 82A of the first holding portion 82 (see FIG. 3A), and the second protruding portions 60 are anchored on the abutting surface 84A of the second holding portion 84 (see FIG. 3B). At this time, the first projecting portion 64 is housed in the housing portion 82B of the first holding portion 82 (see FIG. 3A), and the second projecting portion 66 is housed in the housing portion 84B of the second holding portion 84 (see FIG. 3B).

Note that when the front-side garnish 52 has been pressed against the clamp 70, if the first projecting portion 64 is not housed inside the housing portion 82B, then it is sufficient to press the end portion 52D side of the front-side garnish 52 in the direction in which the opening 52B is closed (i.e., in the opposite direction from the direction indicated by the arrow X in FIG. 3A). Additionally, when the front-side garnish 52 has been pressed against the clamp 70, if the second projecting portion 66 is not housed inside the housing portion 84B, then it is sufficient to press the end portion 52E side of the front-side garnish 52 in the direction in which the opening 52B is closed (i.e., in the opposite direction from the direction indicated by the arrow X in FIG. 3B).

As is described above, the task of fixing the front-side garnish 52 to the clamp 70 is completed when the protruding portions 52 and the projecting portions 62 are held by the holding portion 80.

(Actions and Effects)

Actions and effects of the present exemplary embodiment will now be described.

The vehicle pillar structure 10 of the present exemplary embodiment is characterized in that the clamp 70 is disposed between the first pillar 26 and the front-side garnish 72. Here, the clamp 70 functions as an impact absorbing body when the vehicle 12 is in a collision, for example, when the head portion of a vehicle occupant collides with the first pillar 26.

More specifically, an example in which a head impact dummy H is in a collision will be described. Firstly, prior to a collision, the clamp 70 is disposed such that, when viewing a cross-section thereof extending in a perpendicular direction relative to the longitudinal direction, no gap exists from the surface of the first pillar 26 as far as the rear surface 52C of the front-side garnish 52 (see FIG. 2). Here, when the vehicle 12 is in a frontal collision, in some cases, the head impact dummy H comes into contact with the apex portion 52A of the front-side garnish 52, which is the portion that protrudes from the front pillar 24.

Figure 5:
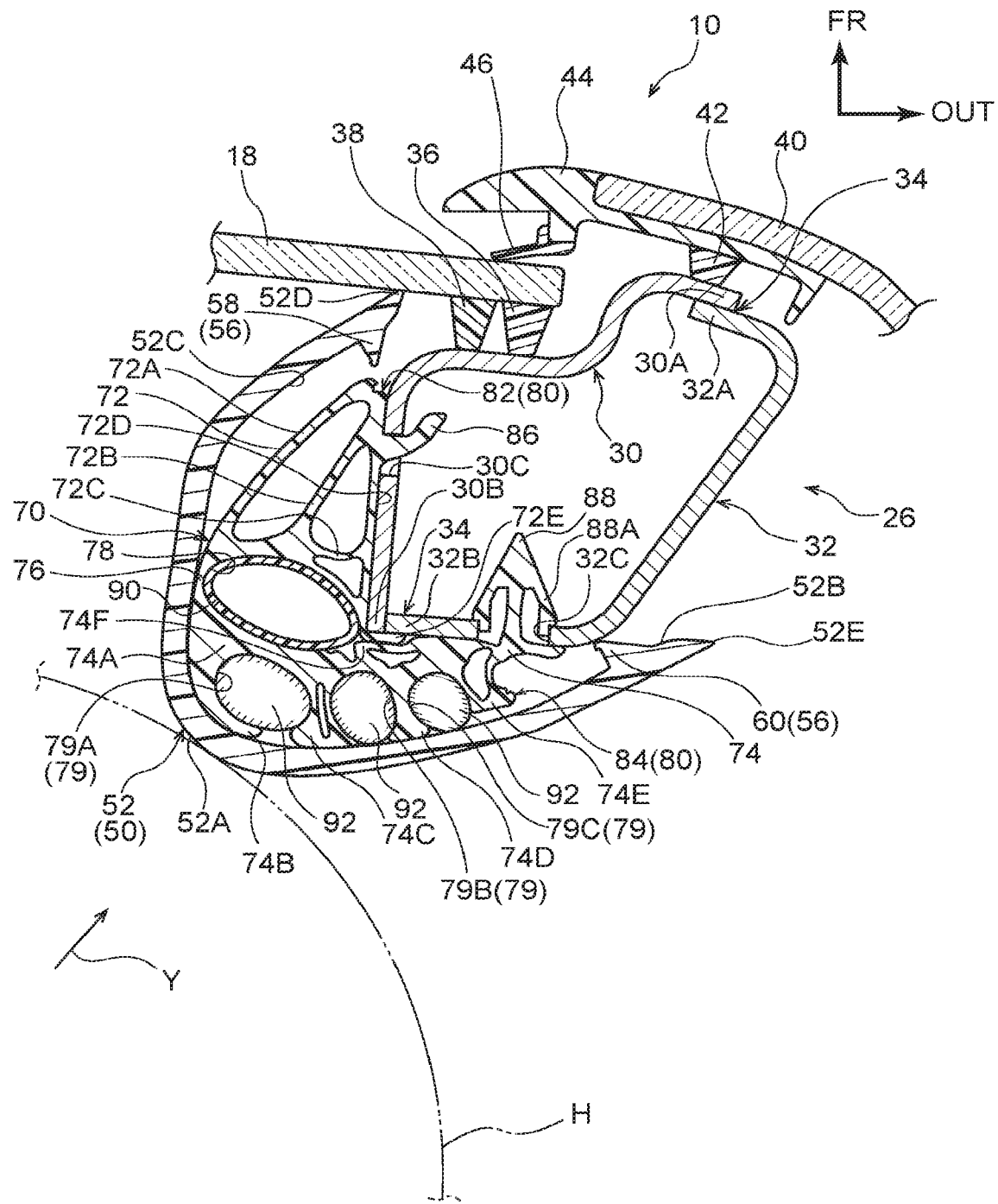
FIG. 5 is a cross-sectional view illustrating an action of the vehicle pillar structure according to an exemplary embodiment.

When the head impact dummy H makes contact with the apex portion 52A, the clamp 70 receives compression force via the front-side garnish 52. Additionally, as is shown in FIG. 5, as a result of both the first base portion 72 and the second base portion 74 undergoing elastic deformation, the clamp 70 collapses in the direction of input of the compression force (i.e., in the direction indicated by an arrow Y). As a result, the clamp 70 slows the motion of the head impact dummy H.

Note that when the clamp 70 receives the compression force and is elastically deformed, in some cases, the drain hose 90 and the wire harnesses 92 are also deformed. In addition, as a result of the elastic deformation of the clamp 70, in some cases, the protruding portions 56 and the projecting portions 62 are released from the holding portion 81, namely, the front-side garnish 52 comes away from the clamp 70. This deformation of the drain hose 90 and the wire harnesses 92, and also the front-side garnish 52 coming away from the clamp 70 do not affect the impact absorption performance of the clamp 70.

In this way, by disposing the elastically deformable clamp 70 in such a way that there are no gaps between the first pillar 26 and the front-side garnish 52, compared with a conventional structure such as that disclosed in JP-A No. 2001-163252, the initial load value when the head impact dummy H collides with the front-side garnish 52 is raised. As a consequence, because it is possible to reduce the moving distance of the head impact dummy H in a collision, the impact absorption performance is improved. According to the vehicle pillar structure 10 of the present exemplary embodiment, because the clamp 70, which is a supporting component that supports the drain hose 90 and the wire harnesses 92, can be provided with impact absorption properties, both the collision absorption rib and the space required to house the rib are no longer necessary. Namely, according to the present exemplary embodiment, it is possible to achieve a reduction in the size of the pillar cross-section at the same time as the ability to protect a vehicle occupant is maintained.

Moreover, in addition to functioning as an impact absorption body, the clamp 70 also functions as a supporting component that supports the drain hose 90 and the wire harnesses 92 on the first pillar 26. As is shown in FIG. 2, the housing portion 78, in which the drain hose 90 is housed, and the restraining portion 79, in which the wire harnesses 92 are housed, are provided extending in the longitudinal direction in the clamp 70 of the present exemplary embodiment. Here, as is described above, in order to ensure a superior impact absorption performance, it is necessary for the clamp 70, which is serving as the impact absorption body, to be clamped firmly to the first pillar 26.

In contrast, when the first pillar 26 that forms the front pillar 24 has a small cross-section, then it is difficult to fix the clamp 70 on the same planar surface as the first pillar 26. Therefore, in the clamp 70 of the present exemplary embodiment, the first base portion 72 and the second base portion 74 are formed so as to be fixed to mutually different surfaces of the first pillar 26. Namely, in the present exemplary embodiment, by fixing the clamp 70, which is serving as the impact absorption body, to a plurality of mutually different surfaces of the first pillar 26, the clamp 70 can be firmly fixed even to a first pillar 26 having a small-sized cross-section.

Furthermore, the clamp 70 of the present exemplary embodiment is characterized in having the hinge portion 76 that rotatably connects the second base portion 74 to the first base portion 72. Namely, according to the present exemplary embodiment, because the clamp 70 can be opened and closed via the hinge portion 76, the clamp 70 can be mounted easily even when the first pillar 26 has a small-sized cross-section.

Moreover, the present exemplary embodiment is characterized in that a space bounded by the first base portion 72, the hinge portion 76, and the second base portion 74 forms the housing portion 78 where the drain hose 90 is housed. According to the present exemplary embodiment, because the housing portion 78 can be opened and closed via the hinge portion 76, the drain hose 90, whose outer diameter is greater than that of the wire harnesses 92, can be easily fixed to the clamp 70. Moreover, because the drain hose 90 is gripped by the hinge portion 76, the drain hose 90 can be reliably fixed to the clamp 70.

Additionally, in the present exemplary embodiment, as is shown in FIG. 3A and FIG. 3B, as a result of the protruding portions 56 and projecting portions 62 that are provided on the front-side garnish 52 being held by the holding portion 80, the front-side garnish 52 is fixed to the clamp 70. As a consequence, the front-side garnish 52 is fixed via the clamp 70 to the first pillar 26 and, additionally, the first pillar 26 is covered by the front-side garnish 52. Here, the projecting portions 62 of the present exemplary embodiment are formed protruding in a direction that intersects the direction faced by the opening 52B in the vertical surfaces 58B and 60B of the protruding portions 56. Accordingly, according to the projecting portions 62 of the present exemplary embodiment, it is possible to inhibit the end portion 52D from separating from the first base portion 72, and the end portion 52E from separating from the second base portion 74 in the front-side garnish 52. Namely, the front-side garnish 52 can be prevented from coming free from the clamp 70.

(Remarks)

The vehicle pillar structure 10 of the present exemplary embodiment is provided on the first pillar 26 of the front pillar 24 which has both the first pillar 26 and the second pillar 28, however, the present disclosure is not limited to this. For example, it is also possible to provide the vehicle pillar structure 10 on the second pillar 28 instead of on the first pillar 26, or to provide it on both the first pillar 26 and the second pillar 28. Moreover, the vehicle pillar structure 10 may also be provided on a front pillar that is made up of only one pillar-shaped component. Furthermore, the vehicle pillar structure 10 may also be provided not only on a front pillar, but also on a center pillar, or a quarter pillar or the like.

An exemplary embodiment of the present disclosure has been described above, however, the present disclosure is not limited to this. Various modifications and the like may be made to the present disclosure insofar as they do not depart from the spirit or scope of the present disclosure.

What is claimed is:

1. A vehicle pillar structure comprising:
   a pillar-shaped component that forms a pillar;
   a pillar garnish that is disposed on a vehicle cabin side of the pillar-shaped component; and
   a supporting component that is provided between the pillar-shaped component and the pillar garnish and is capable of undergoing elastic deformation, and that supports one or a plurality of mounted components that have been mounted along the pillar-shaped component.

2. The vehicle pillar structure according to claim 1, wherein:
   the pillar garnish is formed substantially in a U shape whose cross-section has an opening on a pillar-shaped component side thereof, the pillar garnish including:
      protruding portions that are formed protruding from a rear surface of the pillar garnish, and
      projecting portions that are formed on the protruding portions so as to protrude in a direction that intersects a direction faced by the openings; and
   the supporting component has a holding portion that holds the protruding portions and the projecting portions.

3. The vehicle pillar structure according to claim 1, wherein the supporting component comprises:
   a first base portion on which are formed first fixing portions for fixing the pillar-shaped component;
   a second base portion on which are formed second fixing portions for fixing the pillar-shaped component; and
   a hinge portion that rotatably connects the second base portion to the first base portion.

4. The vehicle pillar structure according to claim 3, wherein the first fixing portions and the second fixing portions are fixed to mutually different surfaces of the pillar-shaped component.

5. The vehicle pillar structure according to claim 3, wherein a space bounded by the first base portion, the hinge portion, and the second base portion forms a housing portion in which one of the mounted components is housed.

6. The vehicle pillar structure according to claims 3, wherein
   the first fixing portions are hooks that are hooked inside through holes in the pillar-shaped component, and
   the second fixing portions are clips that are anchored in fixing holes in the pillar-shaped component.

7. The vehicle pillar structure according to claims 1, wherein the supporting component further comprises:
   a plurality of tube portions that are formed extending along the pillar-shaped component.

* * * * *